United States Patent
Moriya et al.

(10) Patent No.: US 11,964,572 B2
(45) Date of Patent: Apr. 23, 2024

(54) VEHICLE

(71) Applicant: SUBARU CORPORATION, Tokyo (JP)

(72) Inventors: Fumiyuki Moriya, Tokyo (JP); Kazuya Fuke, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 963 days.

(21) Appl. No.: 16/717,635

(22) Filed: Dec. 17, 2019

(65) Prior Publication Data

US 2020/0307391 A1    Oct. 1, 2020

(30) Foreign Application Priority Data

Mar. 27, 2019   (JP) ................. 2019-059634

(51) Int. Cl.
| | | |
|---|---|---|
| *B60L 50/15* | (2019.01) | |
| *B60L 50/64* | (2019.01) | |
| *B60L 53/22* | (2019.01) | |
| *B60L 58/12* | (2019.01) | |
| *B60L 53/16* | (2019.01) | |
| *B60L 53/18* | (2019.01) | |
| *B60L 53/66* | (2019.01) | |

(52) U.S. Cl.
CPC .............. *B60L 50/15* (2019.02); *B60L 50/64* (2019.02); *B60L 53/22* (2019.02); *B60L 58/12* (2019.02); *B60L 53/16* (2019.02); *B60L 53/18* (2019.02); *B60L 53/66* (2019.02)

(58) Field of Classification Search
CPC .......... B60L 1/006; B60L 50/15; B60L 50/64; B60L 53/22; B60L 58/12; B60L 53/16; B60L 53/18; B60L 53/66
See application file for complete search history.

(56) References Cited

U.S. PATENT DOCUMENTS

| | | |
|---|---|---|
| 2010/0072953 A1 | 3/2010 | Mitsutani |
| 2018/0345798 A1 | 12/2018 | Sakakibara |
| 2020/0055473 A1* | 2/2020 | Ferrel ................. H02J 1/10 |

FOREIGN PATENT DOCUMENTS

| | | |
|---|---|---|
| JP | 2010/081677 | 4/2010 |
| JP | 2011-083076 A | 4/2011 |
| JP | 2011/199920 | 10/2011 |
| JP | 2018/207558 | 12/2018 |

OTHER PUBLICATIONS

Japanese Office Action, dated Nov. 22, 2022, in Japanese Application No. 2019-059634 and English Translation thereof.

* cited by examiner

*Primary Examiner* — Elim Ortiz
(74) *Attorney, Agent, or Firm* — MCGINN I.P. LAW GROUP, PLLC

(57) ABSTRACT

A vehicle includes a battery, an electric power acquirer, a power supply unit, and a controller. The electric power acquirer is able to acquire, from outside the vehicle, electric power to be charged to the battery. The power supply unit is able to receive electric power from a power line and supply a power supply voltage to a device other than a traveling motor. The controller is able to execute electric power adjustment processing on the condition that electric power is acquired from the electric power acquirer and the power supply unit is in operation. The electric power adjustment processing includes reducing a difference between electric power to be acquired from the electric power acquirer and electric power to be inputted to the power supply unit.

14 Claims, 4 Drawing Sheets

VEHICLE

CROSS-REFERENCE TO RELATED APPLICATIONS

This application claims priority from Japanese Patent Application No. 2019-059634 filed on Mar. 27, 2019, the entire contents of which are hereby incorporated by reference.

BACKGROUND

The technology relates to a vehicle including a battery and an electric power acquirer that is able to acquire electric power for battery charging from outside the vehicle.

SUMMARY

An aspect of the technology provides a vehicle including a battery, an electric power acquirer, a power supply unit, and a controller. The battery is configured to accumulate electric power for travel of the vehicle. The electric power acquirer is able to acquire, from outside the vehicle, electric power to be charged to the battery. The power supply unit is able to receive electric power from a power line and supply a power supply voltage to a device other than a traveling motor. The power line is coupled to the battery and to the electric power acquirer. The controller is configured to perform a control of electric power transmission through the power line. The controller is able to execute electric power adjustment processing on the condition that electric power is acquired from the electric power acquirer and the power supply unit is in operation. The electric power adjustment processing includes reducing a difference between electric power to be acquired from the electric power acquirer and electric power to be inputted to the power supply unit.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
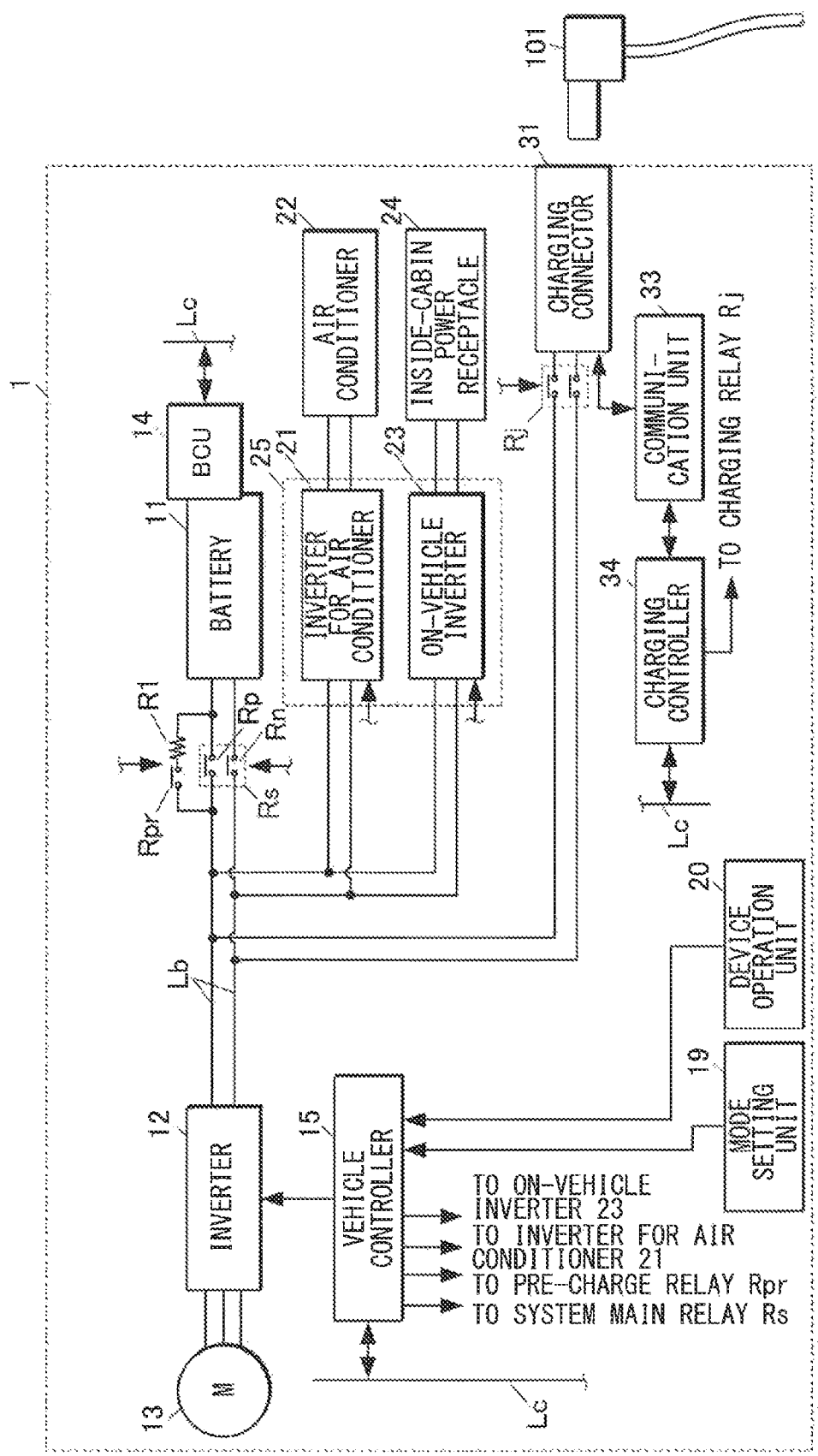
FIG. 1 is a block diagram illustrating a vehicle according to an embodiment of the technology.

Vehicles such as electric vehicles (EV) and plug-in hybrid electric vehicles (PHEV) include a battery and an electric power acquirer. The battery accumulates electric power for travel of a vehicle. The electric power acquirer is able to acquire charging electric power for the battery from outside. In such vehicles, utilities have been recently put into practical use. The utilities supply a power supply voltage to various electric devices with utilization of electric power of the battery. The utilities make it possible, for example, to drive an electric air conditioner of a vehicle, or to supply an AC power supply voltage from a power receptacle attached inside a vehicle cabin. The supply of the AC power supply voltage makes it possible to use, for example, a home electric appliance inside the vehicle cabin.

As to the related techniques, reference can be made to Japanese Unexamined Patent Application Publication (JP-A) No. 2011-83076 that describes a vehicle in which on a request for operation of an air conditioner in the course of charging of a battery, requested electric power is so determined as to allow a charger to output electric power equivalent to a total of electric power for the air conditioner and electric power for the charging of the battery. The requested electric power is determined on the basis of chargeable electric power of the battery, leading to suppression of excessive charging of the battery.

Let us assume that electric power acquisition is made by a similar control to charge the battery to full charge, regardless of whether or not the utilities are in use. In this case, when the battery becomes fully charged, the electric power acquisition is stopped. Thereafter, the utilities consume electric power of the battery, causing a decrease in a state of charge (SOC) of the battery. Thus, the electric power acquisition is carried out again, causing the battery to be charged to full charge. Such repetition of discharging and charging of the battery may contribute to early deterioration in the battery. The technique of JP-A No. 2011-83076 may also involve repetition of discharging of the battery by driving the air conditioner and the charging of the battery through the charger.

It is desirable to provide a vehicle that makes it possible to suppress repetition of discharging and charging of a battery, in a case with electric power utilization concurrently with the charging of the battery.

In the following, some preferred but non-limiting embodiments of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. Throughout the specification and the drawings, elements having substantially the same function and configuration are denoted with the same reference characters to avoid redundant description, and elements not in direct relation to the technology may not be illustrated.

FIG. 1 is a block diagram illustrating a vehicle according to an embodiment of the technology. A vehicle 1 according to the embodiment of the technology may be, for example, an automobile such as an EV and a PHEV. The vehicle 1 may include a battery 11, a traveling motor 13, an inverter 12, and a battery control unit (BCU) 14. The battery 11 may accumulate electric power for travel of the vehicle 1. The traveling motor 13 may drive a driving wheel. The inverter 12 may convert electric power between the battery 11 and the traveling motor 13. The BCU 14 may manage a state of the battery 11. The battery 11 may output a high voltage that drives the traveling motor 13 and may be referred to as a high-voltage battery. The battery 11 may include, for example, a secondary battery such as a lithium-ion storage battery or a nickel hydrogen storage battery.

The vehicle 1 may further include a system main relay Rs, a pre-charge relay Rpr, and a pre-charge device R1. The system main relay Rs may include a positive-electrode-side relay Rp and a negative-electrode-side relay Rn. The battery 11 may be coupled to a power line Lb through the system main relay Rs. In a case with the system main relay Rs in a disconnected state, the battery 11 and the power line Lb may be electrically disconnected in order to hinder a current flow therebetween. In a case with the system main relay Rs in a connected state, the battery 11 and the power line Lb may be electrically coupled in order to cause a current flow therebetween. The system main relay Rs being in the "connected state" means that both the positive-electrode-side relay Rp and the negative-electrode-side relay Rn are turned on. The system main relay Rs being in the "disconnected state" means that the positive-electrode-side relay Rp or the negative-electrode-side relay Rn, or both, are turned off.

In a case with a great voltage difference between the power line Lb and the battery 11, the pre-charge relay Rpr and the pre-charge device R1 are able to perform pre-charging of the power line Lb or input capacitance of a device coupled to the power line Lb, causing a mild rise in a voltage of the power line Lb. The pre-charge device R1 may include, for example, a resistor.

The vehicle 1 may further include a power supply unit 25. The power supply unit 25 may supply a power supply voltage to an electric device other than the traveling motor 13. The power supply unit 25 may include, for example, subunits such as an inverter for air conditioner 21 and an on-vehicle inverter 23. The inverter for air conditioner 21 may convert electric power transmitted from the power line Lb and output driving electric power to an air conditioner 22, that is, for example, to a compressor. The on-vehicle inverter 23 may convert electric power transmitted from the power line Lb into an AC power supply voltage, and output the AC power supply voltage to an inside-cabin power receptacle 24. An occupant of the vehicle 1 may allow the on-vehicle inverter 23 to operate, and thereby be able to couple, for example, a home electric appliance to the inside-cabin power receptacle 24 and use the home electric appliance.

Instead of the inside-cabin power receptacle 24, or in addition to the inside-cabin power receptacle 24, a vehicle exterior power receptacle may be coupled to the on-vehicle inverter 23. The vehicle exterior power receptacle makes it possible to use an electric appliance near the vehicle 1, or outside a cabin of the vehicle 1. In another alternative, instead of the on-vehicle inverter 23, the power supply unit 25 may include a connector and a relay to which an external inverter may be coupled. Coupling the external inverter to the connector and turning the relay on causes electric power supply from the power line Lb to the inverter in accordance with a control by the vehicle controller 15, causing an AC power supply voltage to be outputted from the external inverter to the vehicle exterior power receptacle. With such a configuration, it is possible for a user of the vehicle 1 to use a home electric appliance near the vehicle 1.

The vehicle 1 may further include a vehicle controller 15. The vehicle controller 15 may perform a travel control of the vehicle 1 and a control of each part of the vehicle 1. The vehicle controller 15 may include a single electronic control unit (ECU), or alternatively, the vehicle controller 15 may include a plurality of ECUs that operate in cooperation with one another. The ECU may include a central processing unit (CPU), a storage, and a random access memory (RAM). The storage may hold control programs to be executed by the CPU and control data. The RAM is provided for expansion of data by the CPU.

The vehicle controller 15 may drive the inverter 12 in accordance with, for example, an operation of a driving operation unit, to cause powering operation or regenerative operation of the traveling motor 13. This leads to the travel of the vehicle 1 in accordance with a driving operation. In addition, the vehicle controller 15 may perform a switching control of the system main relay Rs and the pre-charge relay Rpr, a start-up and stop control of the subunits of the power supply unit 25, and a control of inputs from the occupant through a mode setting unit 19 and a device operation unit 20. Non-limiting examples of the inputs from the occupant through the device operation unit 20 may include a request for a start-up of the subunits of the power supply unit 25. The mode setting unit 19 is able to set a control mode of the vehicle 1. Non-limiting examples of the control mode to be set by the mode setting unit 19 may include a deterioration suppression mode. The deterioration suppression mode includes suppressing deterioration in the battery 11. The mode setting unit 19 and the device operation unit 20 may be located at a position where the occupant in a vehicle cabin is able to operate them, e.g., on a dashboard. It is to be noted that the mode setting unit 19 or the device operation unit 20, or both, do not have to be located in the vehicle cabin. Instead, adopted may be a configuration in which mode setting or a control of the subunits, or both, are available from a mobile device such as a so-called smartphone through telematics service.

The vehicle 1 may further include a charging connector 31, a communication unit 33, and a charging controller 34. The charging connector 31 is able to acquire, from outside the vehicle 1, electric power to be charged to the battery 11. The communication unit 33 may perform communication with electric power transmission facilities outside the vehicle 1, through the charging connector 31. The charging controller 34 may perform a charging control of the battery 11. A charging relay Rj may be provided between the charging connector 31 and the power line Lb. The charging controller 34 may communicate with the BCU 14 and the vehicle controller 15 through a communication line Lc and perform the charging control of the battery 11 in cooperation with them. The charging controller 34 and the BCU 14 may include, for example, an ECU. The charging controller 34 is able to give the electric power transmission facilities a request for electric power transmission and a request for a stop of the electric power transmission, through the communication unit 33, with a charging plug 101 of the electric power transmission facilities coupled to the charging connector 31. The request for the electric power transmission may include, for example, a request to define magnitude of electric power and a request for a constant-voltage output. The charging controller 34 may perform switching of the charging relay Rj and give the electric power transmission facilities the request for the electric power transmission and the request for the stop, making it possible to switch between an output and a stop of a DC voltage from the charging plug 101, and to switch between an output and a stop of the DC voltage from the charging connector 31 to the power line Lb.

In one embodiment of the technology, the charging connector 31 may serve as an "electric power acquirer". In one embodiment of the technology, the vehicle controller 15 and the charging controller 34 may serve as a "controller".

It is to be noted that in the forgoing example of the charging connector 31, an example is given where the charging plug 101 that outputs the DC voltage may be coupled to the charging connector 31. Instead of the charging connector 31 as mentioned above, or in addition to the charging connector 31, provided may be an AC charging connector to which an AC voltage is inputted. In this case, a converter may be provided between the AC charging connector and the power line Lb. The converter may convert an AC power supply voltage into a DC voltage for the charging. The charging controller 34 may switch between a start-up and a stop of the converter, causing switching between an output and a stop of the DC voltage for the charging to the power line Lb.

<Selection Processing of Electric Power Transmission Mode>

Figure 2:
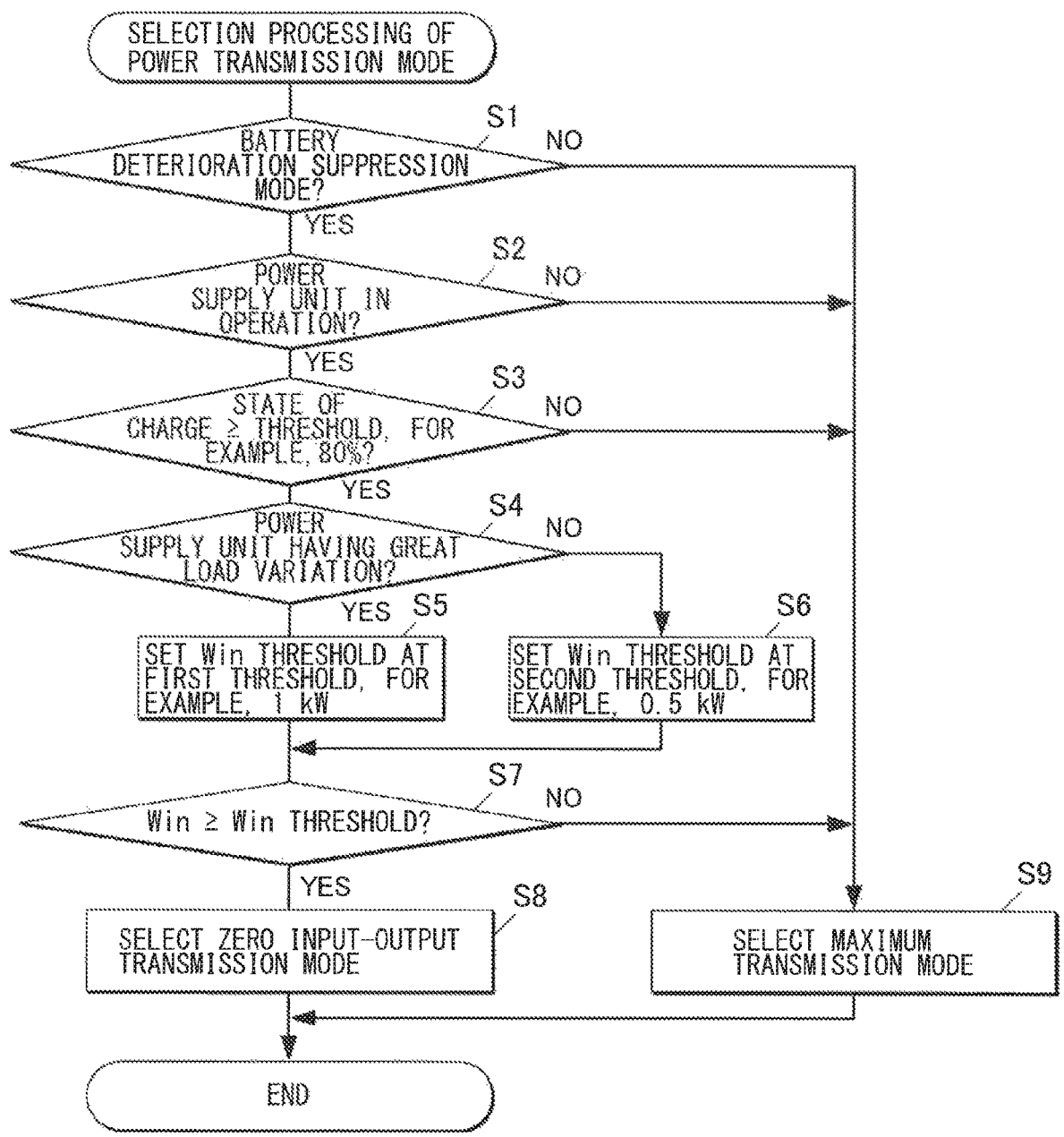
FIG. 2 is a flowchart illustrating a procedure of selection processing of an electric power transmission mode to be executed by a vehicle controller.

FIG. 2 is a flowchart illustrating a procedure of selection processing of an electric power transmission mode to be executed by the vehicle controller 15. The selection processing may be executed on predetermined control cycles, in a case where, for example, the charging relay Rj is turned on to cause the DC voltage to be outputted from the charging plug 101 to the power line Lb.

At the start of the selection processing of the electric power transmission mode, the vehicle controller 15 may make a determination as to whether or not the control mode of the vehicle 1 is the deterioration suppression mode of the battery 11 (step S1), a determination as to whether or not the power supply unit 25 is in operation (step S2), and a determination as to whether or not a state of charge of the battery 11 is higher than a threshold, e.g., 80%, that indicates a level at which the travel of the vehicle 1 is not hindered (step S3).

In the case with positive determination results for steps S1 to S3 (steps S1 to S3: YES), the vehicle controller 15 may determine magnitude of an abrupt load variation that may possibly occur in the power supply unit 25 in operation (step S4). For example, in the inverter for air conditioner 21, output electric power changes mildly even in a case where, for example, the air conditioner 22 switches its operation modes or stops. Accordingly, to the inverter for air conditioner 21, assigned may be a relatively smaller value as an indicator value of the abrupt load variation. Meanwhile, in the on-vehicle inverter 23, a load sometimes changes abruptly because of connection or disconnection of an electric device to or from the inside-cabin power receptacle 24. Accordingly, to the on-vehicle inverter 23, assigned may be a relatively greater value as the indicator value of the abrupt load variation. In step S4, the vehicle controller 15 may calculate a total of the indicator values of the abrupt load variation assigned to one or more subunits in operation of the power supply unit 25, and compare the total with a predetermined threshold to determine the magnitude of the abrupt load variation.

As a result of the determination of step S4, in a case with a determination that the power supply unit 25 in operation has a great load variation (step S4: YES), the vehicle controller 15 may set a first threshold of greater magnitude, e.g., 1 kW, as a Win threshold (step S5). Meanwhile, in a case with a determination that the power supply unit 25 in operation has a small load variation (step S4: NO), the vehicle controller 15 may set a second threshold smaller than the first threshold, e.g., 0.5 kW, as the Win threshold (step S6).

Thereafter, the vehicle controller 15 may compare currently chargeable electric power Win of the battery 11 with the Win threshold set in step S5 or S6 (step S7). In a case where the chargeable electric power Win is equal to or greater than the Win threshold (step S7: YES), the vehicle controller 15 may allow the processing to proceed to step S8. In a case where the chargeable electric power Win is smaller than the Win threshold (step S7: NO), the vehicle controller 15 may allow the processing to proceed to step S9. The chargeable electric power Win means maximum electric power that is normally chargeable to the battery 11. The chargeable electric power Win varies with, for example, the state of charge, a temperature, and internal resistance of the battery 11, and may be calculated from data monitored by the BCU 14. The chargeable electric power Win is also referred to as charging limit electric power or charging upper limit electric power.

In a case with a negative determination result for any one of steps S1 to S4 and S7 (step S1, S2, S3, S4, or S7: NO), the vehicle controller 15 may select a maximum transmission mode as a mode of electric power transmission through the power line Lb (step S9). The maximum transmission mode is a mode that includes allowing maximum electric power to be outputted from the charging plug 101 within a range in which electric power to be charged to the battery 11 is no greater than the chargeable electric power Win. In the maximum transmission mode, the charging controller 34 may request the electric power transmission facilities to output maximum electric power, in a case where the state of charge of the battery 11 is low and the chargeable electric power Win is greater than maximum output electric power of the electric power transmission facilities. Moreover, in a case where the state of charge of the battery 11 is high and the chargeable electric power Win is small, the charging controller 34 may request, in consideration of the abrupt load variation, an output of the electric power transmission facilities, to allow the battery 11 to be charged with electric power equivalent to the chargeable electric power Win multiplied by a coefficient for a margin, e.g., 90% or 80%.

In one embodiment of the technology, the maximum transmission mode may serve as a "second transmission mode".

Meanwhile, in a case with positive determination results for steps S1 to S4 and S7 (step S1, S2, S3, S4, and S7: YES), the vehicle controller 15 may select a zero input-output transmission mode as the mode of the electric power transmission through the power line Lb (step S8). The zero input-output transmission mode is a mode that includes reducing a difference between electric power to be inputted from the charging plug 101 and electric power to be outputted to the power supply unit 25 and making an adjustment of bringing the difference to zero or a sufficiently small value. This adjustment may be made by allowing the charging controller 34 to request the electric power transmission facilities to match an output voltage of the charging plug 101 with an output voltage of the battery 11. In another alternative, the adjustment may be made by allowing the charging controller 34 to make a feedback control based on an input current and an output current of the battery 11, and request the electric power transmission facilities to increase and lower the output voltage of the charging plug 101. The feedback control causes the output voltage of the charging plug 101 to increase and lower, allowing the input current and the output current of the battery 11 to converge on zero.

This leads to reduction in the difference between electric power to be inputted from the charging plug 101 and electric power to be outputted to the power supply unit 25. In addition, there are cases where an electric device that operates while being supplied with a power supply voltage from the power supply unit 25 includes a mechanism that is able to change magnitude of a load. In such a case, the zero input-output transmission mode may be provided by making a feedback control in which the vehicle controller 15 changes operation modes of the electric device to allow the input current and the output current of the battery 11 to converge on zero. Non-limiting example of the electric device that is able to change the magnitude of the load may include a heater.

In one embodiment of the technology, the zero input-output transmission mode may serve as a "first transmission mode". In one embodiment of the technology, the adjustment as mentioned above may serve as "electric power adjustment processing".

After the mode of the electric power transmission is decided in step S8 or S9, the selection processing of the electric power transmission mode is terminated. Thus, the vehicle controller 15 may execute the forgoing control processing regarding the electric power transmission, in cooperation with the charging controller 34, to provide the mode of the electric power transmission thus decided.

Figure 3:
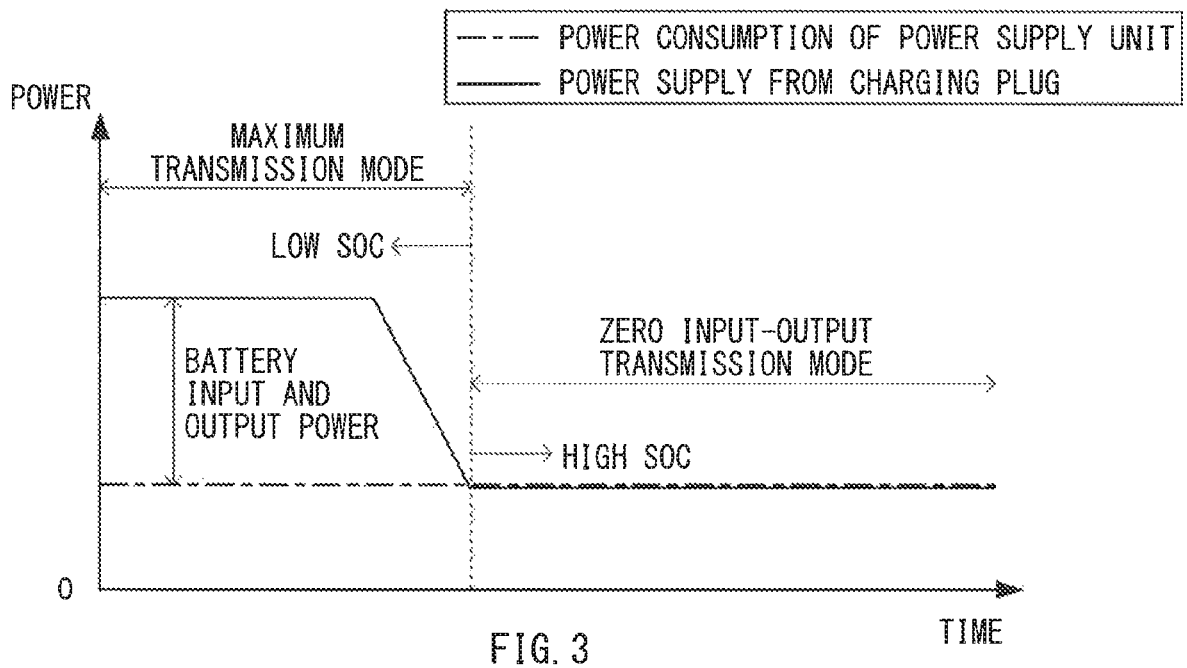
FIG. 3 is a time chart illustrating a charging control in the embodiment.
Figure 4:
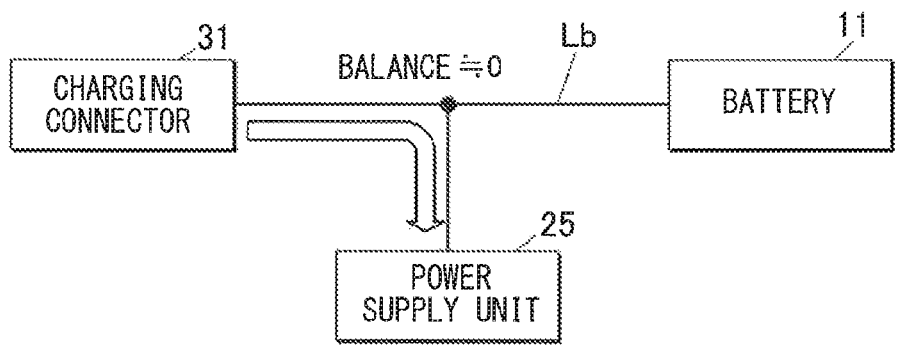
FIG. 4 is a diagram illustrating electric power flow in a zero input-output mode.

FIG. 3 is a time chart illustrating a charging control in this embodiment. FIG. 4 is a diagram illustrating electric power flow in the zero input-output transmission mode. FIGS. 3 and 4 illustrate operation with the control mode of the vehicle 1 set at the deterioration suppression mode of the battery 11.

As illustrated in FIG. 3, in a case where the charging of the battery 11 and the use of the power supply unit 25 are carried out, with the state of charge (SOC) of the battery 11 being low, electric power from the charging plug 101 is supplied in the maximum transmission mode. Electric power equivalent to the difference between electric power to be supplied from the charging plug 101 and electric power to be consumed by the power supply unit 25 is transmitted to the battery 11, causing the battery 11 to be charged.

The state of charge (SOC) of the battery 11 becomes higher, causing a transition to the zero input-output transmission mode. Thereupon, with the control by the vehicle controller 15 and the charging controller 34, the difference between electric power to be supplied from the charging plug 101 and electric power to be consumed by the power supply unit 25 is adjusted to zero or a sufficiently small value. As illustrated in FIG. 4, this adjustment leads to the suppression of the repetition of the discharging and the charging of the battery 11.

Figure 5:
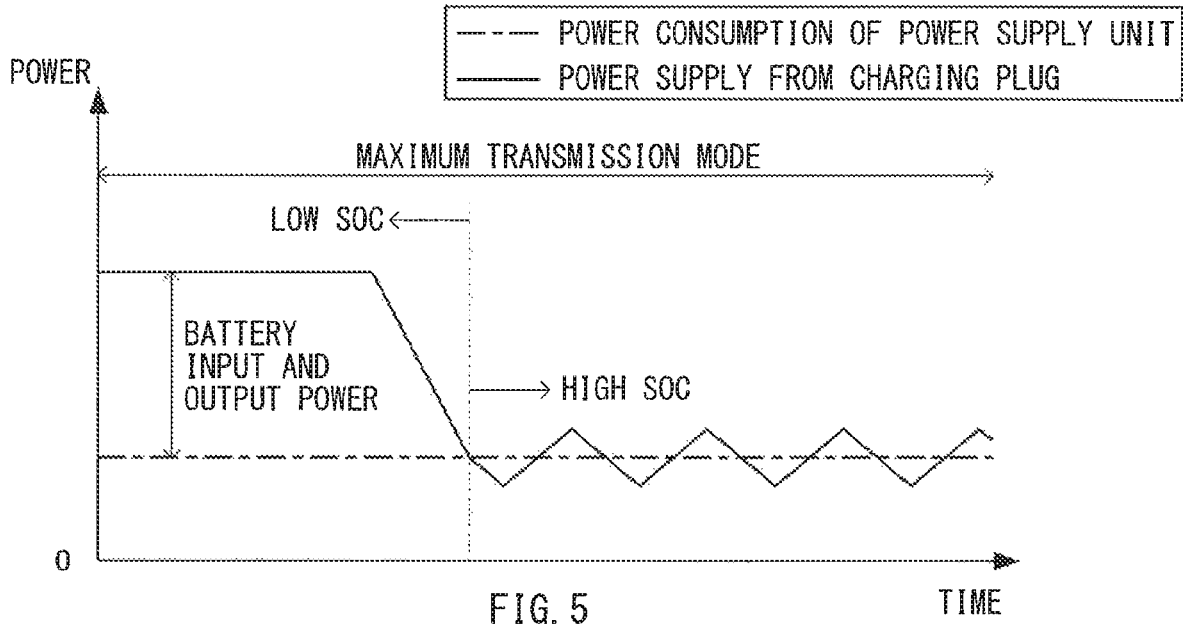
FIG. 5 is a time chart illustrating a charging control in a comparative example.
Figure 6:
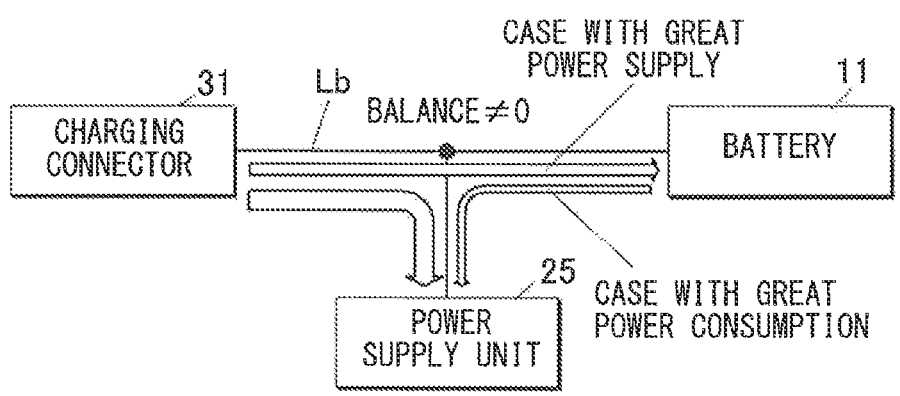
FIG. 6 is a diagram illustrating electric power flow in the comparative example.

FIG. 5 is a time chart illustrating a charging control in a comparative example. FIG. 6 is a diagram illustrating electric power flow in the comparative example. The comparative example illustrates a configuration in which output electric power from the charging plug 101 is controlled in accordance with the chargeable electric power Win of the battery 11.

As illustrated in FIG. 5, in the comparative example, as the state of charge (SOC) of the battery 11 becomes higher and the chargeable electric power Win becomes smaller, electric power to be supplied from the charging plug 101 becomes smaller than electric power to be consumed by the power supply unit 25. At this occasion, as illustrated in FIG. 6, electric power equivalent to the difference therebetween is taken out from the battery 11 to the power supply unit 25. Thus, the state of charge of the battery 11 slightly lowers, and the chargeable electric power Win increases. This causes, again, an increase in electric power to be supplied from the charging plug 101. At this occasion, as illustrated in FIG. 6, electric power equivalent to the difference between electric power to be supplied and electric power to be consumed is transmitted, causing the battery 11 to be charged. As described, the configuration of the comparative example involves the repetition of the discharging and the charging of the battery 11, with the state of charge of the battery 11 being high. This contributes to early deterioration in the battery 11.

In contrast, in this embodiment, as illustrated in FIGS. 3 and 4, it is possible to suppress the repetition of the discharging and the charging of the battery 11, leading to the suppression of the early deterioration in the battery 11.

As described, according to the vehicle 1 of this embodiment, the vehicle controller 15 is able to switch the mode of the electric power transmission through the power line Lb to the zero input-output transmission mode, in the case where electric power is inputted from the charging connector 31 and the power supply unit 25 is in operation. In the zero input-output transmission mode, the vehicle controller 15 and the charging controller 34 execute the electric power adjustment processing that includes reducing the difference between electric power to be supplied from the charging plug 101 and electric power to be inputted to the power supply unit 25. The switching of the transmission modes as described above makes it possible to suppress the repetition of take-out of electric power from the battery 11 to the power supply unit 25, i.e., the discharging, and the charging of the battery 11, even in a case where a normal charging control would cause such repetition of the discharging and the charging of the battery 11. Hence, it is possible to suppress the early deterioration in the battery 11.

Moreover, according to the vehicle 1 of this embodiment, the switching may be made as to whether or not to select the zero input-output transmission mode, on the basis of the value of the chargeable electric power Win of the battery 11 (steps S7 to S9 in FIG. 2). Selecting the zero input-output transmission mode, with the chargeable electric power Win of the battery 11 being small, may cause possibility of excessive charging of the battery 11 in a case with a rapid load decrease in the power supply unit 25. Accordingly, in this embodiment, hindering the transition to the zero input-output transmission mode in accordance with the value of the chargeable electric power Win makes it possible to suppress the situation that may cause the excessive charging of the battery 11.

Furthermore, according to the vehicle 1 of this embodiment, the Win threshold may be varied with whichever subunit is in operation out of the plurality of the subunits, e.g., the inverter for air conditioner 21 and the on-vehicle inverter 23, included in the power supply unit 25. In the case where the chargeable electric power Win of the battery 11 is greater than the Win threshold, the vehicle controller 15 may switch the mode of the electric power transmission to the zero input-output transmission mode. The power supply unit 25 is assumed to include various kinds of subunits: for example, a subunit having an abrupt load variation: a subunit having no abrupt load variation; a subunit having a great load variation; and a subunit having solely a small load variation. Allowing the vehicle controller 15 to change the value of the Win threshold in accordance with whichever subunit of the power supply unit 25 is in operation makes it possible to permit the transition to the zero input-output transmission mode within the range in which the battery 11 is free from the excessive charging.

In addition, according to the vehicle 1 of this embodiment, as illustrated in step S3 in FIG. 2, the switching may be made as to whether or not to select the zero input-output transmission mode, on the basis of the state of charge of the battery 11 (steps S3, S8, and S9 in FIG. 2). For example, in the case with the low state of charge, when the zero input-output transmission mode is selected, the charging does not progress and the state of charge remains low, which gives the user the sense of incongruity. With the forgoing configuration, it is possible to alleviate the sense of incongruity given to the user.

Moreover, according to the vehicle 1 of this embodiment, the zero input-output transmission mode may be selectable in the case where the deterioration suppression mode of the battery 11 is set as the control mode of the vehicle 1 (steps S1, S8, and S9 in FIG. 2). Hence, it is possible to allow the user to select, by the setting of the control mode of the vehicle 1, whether to give priority to a charging speed of the battery 11 or whether to give priority to the suppression of the deterioration in the battery 11.

Furthermore, according to the vehicle 1 of this embodiment, in the case where electric power is inputted from the charging connector 31 and the power supply unit 25 is in operation, the switching may be made between the plurality of the modes of the electric power transmission. The plurality of the modes of the electric power transmission may include the maximum transmission mode and the zero input-output transmission mode. Hence, it is possible to charge the battery 11 at high speed by the maximum transmission mode, in the case with little possibility of the repetition of the discharging and the charging of the battery 11.

Although some preferred but non-limiting embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

For example, a "power supply unit" of the technology is not limited to the configuration in FIG. 1, but may include, for example, a DC/DC converter or a relay. The DC/DC converter may output a DC voltage as a power supply voltage of a device coupled to the power supply unit. The relay may output the voltage of the battery as it is as the power supply voltage of the device coupled to the power supply unit.

Moreover, in the forgoing embodiment, given is a configuration in which the switching may be made as to whether or not to select the zero input-output transmission mode in accordance with a plurality of conditions such as the control mode of the vehicle, the state of charge of the battery, and the chargeable electric power Win of the battery. However, one or more of such conditions may be omitted.

Furthermore, in the forgoing embodiment, a "controller" of the technology is exemplified by the vehicle controller and the charging controller that cooperate with each other to perform the switching of the mode of the electric power transmission. However, the vehicle controller or the charging controller may perform the switching control of the mode of the electric power transmission, or alternatively, a dedicated controller may perform the switching control of the mode of the electric power transmission.

In addition, the forgoing embodiment exemplifies a configuration with an "electric power acquirer" of the technology configured to acquire electric power by wire. However, the "electric power acquirer" of the technology may be configured to acquire electric power wirelessly.

Moreover, in the forgoing embodiment, the configuration is described in which the system main relay Rs keeps the connected state in the case where electric power is inputted from the charging connector 31 and the power supply unit 25 is in operation. However, the zero input-output transmission mode may be accompanied by a control of switching the system main relay Rs to the disconnected state. This leads to further suppression of the repetition of the discharging and the charging of the battery 11. In addition, the details described in the forgoing embodiment may be appropriately changed insofar as the changes fall within a range not departing from the scope of the technology.

According to the aspect of the technology, a controller executes electric power adjustment processing to reduce a difference between electric power to be acquired from an electric power acquirer and electric power to be consumed by a power supply unit. During the electric power adjustment processing, no great discharging is carried out in the battery, nor is great charging carried out in the battery. This makes it possible to suppress significant variations in a state of charge of the battery even in a case with the use of the power supply unit during electric power acquisition. Hence, it is possible to suppress early deterioration in the battery.

The vehicle controller 15 and the charging controller 34 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the vehicle controller 15 and the charging controller 34. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the vehicle controller 15 and the charging controller 34 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle, comprising:
   a battery configured to accumulate electric power for travel of the vehicle;
   an electric power acquirer able to acquire, from outside the vehicle, electric power to be charged to the battery;
   a power supply unit able to receive electric power from a power line and supply a power supply voltage to a device other than a traveling motor, the power line being coupled to the battery and to the electric power acquirer; and a controller configured to perform a control of electric power transmission through the power line, the controller being able to execute electric power adjustment processing on a condition that electric power is acquired from the electric power acquirer and the power supply unit is in operation, the electric power adjustment processing including reducing a difference between electric power to be acquired from the electric power acquirer and electric power to be inputted to the power supply unit, and wherein the controller switches whether or not to execute the electric power adjustment processing, on a basis of chargeable electric power capacity of the battery.

2. The vehicle according to claim 1, wherein the power supply unit includes a plurality of subunits each of which outputs a power supply voltage, and the controller executes the electric power adjustment processing on a condition that the chargeable electric power of the battery is greater than a predetermined threshold, the predetermined threshold being set at a value that varies with whichever subunit of the power supply unit is in operation.

3. The vehicle according to claim 1, wherein the controller switches whether or not to execute the electric power adjustment processing, on a basis of a state of charge of the battery.

4. The vehicle according to claim 2, wherein the controller switches whether or not to execute the electric power adjustment processing, on a basis of a state of charge of the battery.

5. The vehicle according to claim 1, further comprising a mode setting device or circuit able to set a control mode of the vehicle, wherein the controller switches whether or not to execute the electric power adjustment processing, on a basis of the control mode.

6. The vehicle according to claim 2, further comprising a mode setting device or circuit able to set a control mode of the vehicle, wherein the controller switches whether or not to execute the electric power adjustment processing, on a basis of the control mode.

7. The vehicle according to claim 3, further comprising a mode setting device or circuit able to set a control mode of the vehicle, wherein the controller switches whether or not to execute the electric power adjustment processing, on a basis of the control mode.

8. The vehicle according to claim 4, further comprising a mode setting device or circuit able to set a control mode of the vehicle, wherein the controller switches whether or not to execute the electric power adjustment processing, on a basis of the control mode.

9. The vehicle according to claim 2, wherein the controller selects any one of a plurality of modes of electric power transmission on the condition that electric power is acquired from the electric power acquirer and the power supply unit is in operation, and the plurality of the modes of the electric power transmission includes:

a first transmission mode in which the electric power adjustment processing is executed; and a second transmission mode in which maximum electric power is acquired from the electric power acquirer, within a range in which electric power to be charged to the battery is no greater than the chargeable electric power of the battery.

10. The vehicle according to claim 3, wherein the controller selects any one of a plurality of modes of electric power transmission on the condition that electric power is acquired from the electric power acquirer and the power supply unit is in operation, and the plurality of the modes of the electric power transmission includes:

a first transmission mode in which the electric power adjustment processing is executed; and a second transmission mode in which maximum electric power is acquired from the electric power acquirer, within a range in which electric power to be charged to the battery is no greater than the chargeable electric power of the battery.

11. The vehicle according to claim 4, wherein the controller selects any one of a plurality of modes of electric power transmission on the condition that electric power is acquired from the electric power acquirer and the power supply unit is in operation, and the plurality of the modes of the electric power transmission includes:

a first transmission mode in which the electric power adjustment processing is executed; and a second transmission mode in which maximum electric power is acquired from the electric power acquirer, within a range in which electric power to be charged to the battery is no greater than the chargeable electric power of the battery.

12. The vehicle according to claim 1, wherein the controller is configured to execute the electric power adjustment by switching a mode of electric power transmission through the power line when on the electric power is acquired from the electric power acquirer and the power supply unit is in operation.

13. A vehicle, comprising:

a battery configured to accumulate electric power for travel of the vehicle;

an electric power acquirer able to acquire, from outside the vehicle, electric power to be charged to the battery;

a power supply unit able to receive electric power from a power line and supply a power supply voltage to a device other than a traveling motor, the power line being coupled to the battery and to the electric power acquirer; and a controller configured to perform a control of electric power transmission through the power line, the controller being able to execute electric power adjustment processing on a condition that electric power is acquired from the electric power acquirer and the power supply unit is in operation, the electric power adjustment processing including reducing a difference between electric power to be acquired from the electric power acquirer and electric power to be inputted to the power supply unit, wherein the controller selects any one of the plurality of modes of electric power transmission on the condition that electric power is acquired from the electric power acquirer and the power supply unit is in operation, and the plurality of the modes of the electric power transmission includes:

a first transmission mode in which the electric power adjustment processing is executed; and a second transmission mode in which maximum electric power is acquired from the electric power acquirer, within a range in which electric power to be charged to the battery is no greater than the chargeable electric power of the battery.

14. A vehicle, comprising:

a battery configured to accumulate electric power for travel of the vehicle;

an electric power acquirer acquires, from outside the vehicle, electric power to be charged to the battery;

a power supply unit receives electric power from a power line and supply a power supply voltage to a device other than a traveling motor, the power line being coupled to the battery and to the electric power acquirer; and a controller configured to perform a control of electric power transmission through the power line, the controller executes electric power adjustment processing including switching electric power transmission modes on a condition that electric power is acquired from the electric power acquirer and the power supply unit is in operation, the electric power adjustment processing including reducing a difference between electric power to be acquired from the electric power acquirer and electric power to be inputted to the power supply unit, and wherein the controller switches whether or not to execute the electric power adjustment processing, on a basis of chargeable electric power capacity of the battery.

* * * * *